United States Patent [19]

Idec et al.

[11] E Re. 31,021

[45] Reissued Aug. 31, 1982

[54] COSMETIC APPLICATOR WITH TRANSPARENT CONTAINER PORTION

[75] Inventors: Eric J. Idec, Madison; Edward F. Klimeck, Waterbury; Eric A. Hultgren, Westport, all of Conn.

[73] Assignee: Eyelet Specialty Co., Inc., Wallingford, Conn.

[21] Appl. No.: 234,574

[22] Filed: Feb. 13, 1981

Related U.S. Patent Documents

Reissue of:

[64] Patent No.: 4,208,144
Issued: Jun. 17, 1980
Appl. No.: 26,755
Filed: Apr. 3, 1979

[51] Int. Cl.[3] ..... B43K 5/12

[52] U.S. Cl. ..... 401/194; 401/78; 132/88.7

[58] Field of Search ..... 401/52, 68–72, 401/75–78, 192, 82, 194; 132/79 C, 88.5, 88.7; 206/385; D28/85–90

[56] References Cited

U.S. PATENT DOCUMENTS

| | | | |
|---|---|---|---|
| D. 117,276 | 10/1939 | Jung | D28/87 |
| D. 180,022 | 4/1957 | Kent | D86/10 |
| D. 180,023 | 4/1957 | Kent | D86/10 |
| D. 255,054 | 5/1980 | Kingsford . | |
| 793,598 | 6/1905 | Marshall . | |
| 1,050,295 | 1/1973 | Riesenberg . | |
| 1,571,794 | 2/1926 | Pinkham . | |
| 1,732,875 | 10/1929 | Anderson | 401/78 |
| 1,907,626 | 5/1933 | Wallace . | |
| 1,909,194 | 5/1933 | Wallace . | |
| 1,943,048 | 1/1934 | Wallace | 401/192 |
| 2,264,482 | 12/1941 | Ridner et al. | 132/88.7 X |
| 2,345,315 | 3/1944 | Anderson | 401/78 |
| 2,399,162 | 4/1946 | Bloecher | 15/138 |
| 2,497,314 | 2/1956 | Libson | 206/45.3 X |
| 2,570,596 | 10/1951 | Ross | 132/88.7 X |
| 2,595,403 | 5/1952 | Neuschaefer | 401/52 X |
| 2,678,128 | 5/1954 | Sherman | 206/56 |
| 2,776,051 | 1/1957 | Warren | 401/192 X |
| 2,921,675 | 1/1960 | Clark et al. | 401/78 |
| 2,999,585 | 9/1961 | Hultgren | 401/77 X |
| 3,047,901 | 8/1962 | Hubbard . | |
| 3,050,212 | 8/1962 | Longo | 401/52 X |
| 3,088,585 | 5/1963 | Solenghi | 206/45.3 |
| 3,310,168 | 3/1967 | Landen | 401/82 X |
| 3,338,458 | 8/1967 | Hultgren | 206/457 X |
| 3,411,853 | 11/1968 | Hoff . | |
| 3,762,545 | 10/1973 | Warner et al. | 206/45.34 |
| 3,850,183 | 11/1974 | Gruska | 132/88.7 X |
| 3,869,043 | 3/1975 | Warner et al. | 206/45.31 |
| 3,990,577 | 11/1976 | Delia | 206/45.34 X |
| 3,991,777 | 11/1976 | Powers et al. | 132/88.7 |
| 4,108,558 | 8/1978 | Radice et al. | 401/78 |

FOREIGN PATENT DOCUMENTS

| | | | |
|---|---|---|---|
| 148761 | 10/1952 | Australia . | |
| 2629316 | 1/1978 | Fed. Rep. of Germany . | |
| 2749088 | 10/1978 | Fed. Rep. of Germany | 401/192 |
| 925270 | 5/1963 | United Kingdom . | |

*Primary Examiner*—Edward M. Coven
*Attorney, Agent, or Firm*—Hopgood, Calimafde, Kalil, Blaustein & Judlowe

[57] ABSTRACT

The invention contemplates a propel-repel container for cosmetic or the like substance wherein the color of the substance may be externally viewable at a location near the point of cosmetic-substance support, without requiring the container to be opened or the substance to be propelled from its retracted position within the container.

19 Claims, 3 Drawing Figures

14
10
15
11
13
12
10
15
11
13
12
17
17'
29
30
15
24
25
23
20
21
22
10
D3
D2
D1
19
18
16'
16
16'
11
26
28
27
12
17'
17
a
b
c
d

COSMETIC APPLICATOR WITH TRANSPARENT CONTAINER PORTION

Matter enclosed in heavy brackets [ ] appears in the original patent but forms no part of this reissue specification; matter printed in italics indicates the additions made by reissue.

BACKGROUND OF THE INVENTION

The invention relates to propel-repel containers of the variety in which use of transparent material enables the shade or content of the product to be displayed to the consumer at the point of purchase.

Present cosmetic containers of the character indicated commonly use a clear cover to display the shade or other nature of the container contents to the prospective customer, without requiring the container to be opened for customer inspection. But such configurations exhibit certain disadvantages, including color fading due to relatively great light-exposure of the cosmetic substance, particularly at the region of presumably initial use by the customer. In addition, such containers require such exposure of cosmetic substance a considerable distance beyond the top edge of the casing, thus leaving the cosmetic substance vulnerable to "clipping" or breakage. Further, such containers generally lack an expensive or "quality look", they are prone to accidental smearing of cosmetic substance on the inside of the cover, and there is a lack of protection of contents while in self-service counter displays.

BRIEF STATEMENT OF THE INVENTION

It is an object of the invention to provide an improved container construction of the character indicated, avoiding or very substantially reducing the disadvantages of prior constructions.

A specific object is to provide such a container wherein viewing inspection for contents can be limited to a relatively small region between ends of the container when in closed condition.

Another specific object is to provide such a container wherein both ends of the closed container may be opaque and lend themselves to a relatively wide variety of options for decorative contouring, color and finish, all without impairing color evaluation of contents for a fully closed container.

A further specific object is to meet the above objects with a construction in which such color inspection of contents is an available feature as long as usable product remains in the container.

A general object is to meet the indicated objects with a construction involving minimum numbers or complexity of parts, simple and fool-proof operation, and inherent low cost.

The foregoing objects and other features are realized in a preferred embodiment in which the inner one of two overlapped rotatable tubular members is of transparent material and projects beyond the end of the outer one of these members. A carrier for cosmetic or the like substance is movable within the tubular members via cam reaction upon their relative rotation. The arrangement is such that for a retracted position of the carrier, virtually all usable cosmetic or the like substance projects beyond the end of the outer tubular member but is enshrouded by the projecting transparent end of the inner tubular member. Finally, a closure cap over the projecting end of the inner tubular member can be thus fitted only to an extent short of adjacency with the outer tubular member, thus leaving a relatively narrow axially central band of the transparent material exposed near the point of cosmetic-substance support by the carrier when in retracted position.

DESCRIPTION OF A PREFERRED EMBODIMENT

Figures 1, 2, 3:
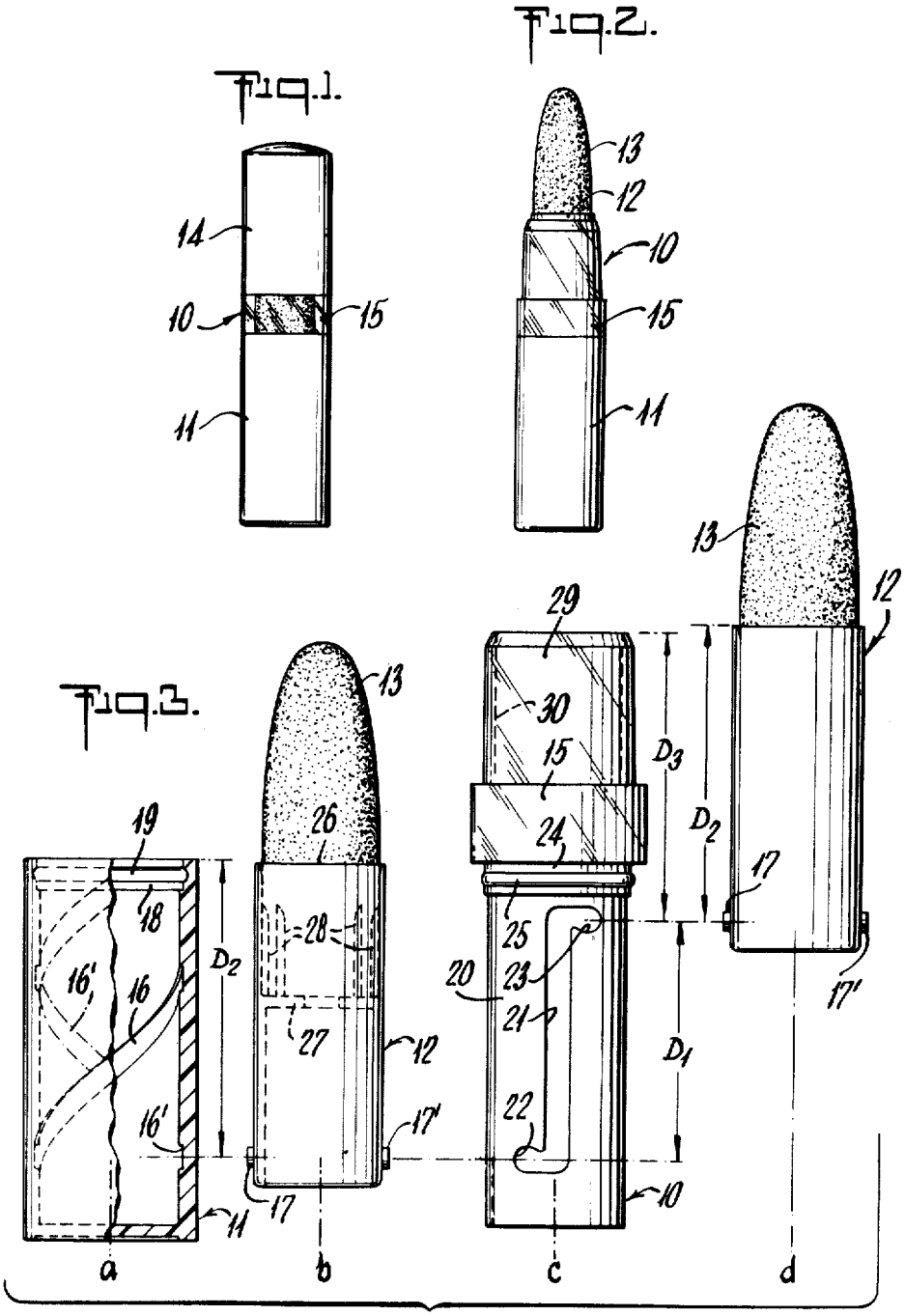

A preferred embodiment of the invention will be illustratively described in conjunction with the accompanying drawings, in which:

FIGS. 1 and 2 are views in elevation for a container of the invention, respectively shown for fully closed and open condition; and FIG. 3 is a collection of four views in elevation, to the same enlarged scale, showing various separated parts of the container of FIGS. 1 and 2, for different relative positions thereof.

Referring initially to FIGS. 1 and 2, the invention is shown in application to a container of the propel-repel variety and comprising inner and outer relatively rotatable tubular members 10–11, having internal propulsion coaction with a carrier cup 12 adapted to support a pomade 13 of cosmetic or the like substance for upward projection, after removal of a cupped closure cap 14. The outer tubular member or base 11 may also be cupped, and an axially generally central band 15 of the inner tubular member 10 is externally exposed between spaced but nearby open ends of the cupped base and cap parts 11–14, when the container is fully closed, and with the carrier cup 12 in its retracted position; it is an important feature of the invention that for this closed and retracted condition, the color of the pomade 13 is viewable through an annular window, by reason of at least band 15 being of clear colorless plastic.

The parts thus far identified are shown in longitudinally correlated but laterally spaced array in the several component drawings of FIG. 3. FIGS. 3a, b, c, respectively depict the relative longitudinal positioning of the base member 11, carrier cup 12, and the inner tubular member or sleeve 10, for the carrier-retracted situation; and FIGS. 3a, d, c, respectively depict the corresponding relation of the same parts for the carrier-projected situation. Each of these three parts 10–11–12 may be a single injection-molded piece of suitable plastic, the parts 11–12 being preferably opaque, and the part 10 being at least translucent and preferably of clear colorless plastic.

As shown, the base member 11 is a tube open at its upper end and closed at its lower end, and with two interlaced helical cam grooves 16–16', for propulsion engagement with diametrically opposed cam-follower projections 17–17' forming part of carrier 12. The radial depth of cam grooves 16–16' substantially matches the radial depth of a counterbore 18 at the open end of the bore of member 11 so that grooves 16–16' communicate axially with but terminate at intersection with counterbore 18. Finally, axially retaining means in the form of a circumferential groove 19 in counterbore 18 extends to a slightly greater maximum radius than counterbore 18. It is indicated that the material and dimensions of member 11 are selected so that the injection-molded part is strippable from the mold, particularly at 19.

The inner tubular member 10 is shown to comprise an elongate lower sleeve portion 20 having two diametrically opposed straight cam slots 21, with detent-protected lateral offsets 22–23 at the respective retraction-limiting and propulsion-limiting ends of the range $D_1$ of coaction with cam followers 17–17'. Sleeve portion 20 is of reduced diameter, compared to band 15, so as to be smoothly journaled in the bore of member 11 and to present band 15 at substantially the outer diameter of member 11, for ease of manual grasp, for rotary actuation purposes. Near juncture with band 15, the sleeve portion 20 includes a circumferential land 24 of rectangular section to substantially fill and also to have running clearance in the counterbore 18, and a circumferentially continuous radially outward bead 25 on land 24 has snap-action engagement with groove 19 to retain an assembled relation between the parts 10–11.

The carrier cup 12 is unusually elongate such that the distance $D_2$ by which its cam followers 17–17' are axially offset from its pomade-supporting end 26 is sufficient to assure substantial registry of the pomade-supporting end 26 with the open end of base member 11, and hence with the lower end of band 15, when the carrier 12 is in its retracted position. An integrally formed bulkhead 27 provides bottoming support for insertion of pomade 13 via end 26, and plural ribs 28 in the bore of this end 26 provide enhanced directionally stabilized retention of the inserted pomade.

The inner tubular member or sleeve 10 is completed by an unusual upward projection or shell 29 formed integrally with band 15 as a reduced extension thereof, and shell 29 will be understood to receive a suitable friction fit to the bore of cap 14, upon closure, to the point of abutment with band 15. The bore 30 of member 10 extends continuously for its length within sleeve portion 20, band 15 and shell projection 29. The full extent of projection 29 is a distance $D_3$ above the upper cam offset 23, and $D_3$ is preferably slightly less than $D_2$, so that, as shown in FIG. 2, the upper end 26 of carrier 12 is slightly beyond the projection 29, for the carrier-elevated position. This relationship will be understood to assure a piloting exposure of the carrier for clean pomade-loading guidance, i.e., free of possible contact with projection 29.

The described construction will be seen to have achieved all stated objects. The clear band 15 provides pomade viewing at all times of container closure and carrier retraction, and this viewing access applies for the shortest or most spent condition of a used and still usable pomade. The three parts 10–11–12 represent the irreducible minimum for a propel-repel container, and no unusual die requirements are imposed to increase complexity or expense of molding dies. The basic simple outer forms (contours) disclosed for parts 11–14 will be understood to indicate that these parts may be externally decorated and contoured to achieve a very wide variety of overall appearances, serving the most demanding requirements of a variety of discriminating customers (cosmetic houses).

While the invention has been described in detail for a preferred form, it will be understood that modifications may be made without departure from the claimed scope of the invention.

What is claimed is:

1. In a container of the variety in which a carrier cup adapted to support cosmetic or the like substance at one end has cam-follower tracking engagement with axial propulsion cams of inner and outer rotatable tubular members, the outer tubular member being open at one end and having a cupped base closing its other end, and the inner tubular member being a sleeve including a portion projecting beyond the open end of said outer member to provide manual access for relative rotation of said members, the improvement in which said carrier cup is characterized by such an axial distance between the cam-follower location and said one end that in the retracted position of said carrier cup (a) said one end of said carrier cup is at substantially the open end of said outer member, and (b) the manually accessible projecting portion of said sleeve is translucent and enshrouds substantially the entire usable length of cosmetic or the like substance carried by said carrier cup.

2. The improvement of claim 1, in which said sleeve is of transparent plastic material, whereby colored cosmetic or the like substance may be to an extent viewable via the manually accessible projecting portion of said sleeve, for a retracted condition of said carrier cup.

3. The improvement of claim 1, in which said manually accessible projecting portion of said sleeve comprises a first radially enlarged circumferential band adjacent the open end of said base member, and a second radially reduced shell projecting axially beyond said band to an extent sufficient to substantially completely overlap cosmetic substance when said carrier cup is in its retracted position.

4. The improvement of claim 3, in which said container includes a cupped closure cap having removable friction fit over said shell and to adjacency with said band, said sleeve being of transparent plastic material, whereby in the closed condition of said container, colored cosmetic or the like substance within the container may be viewed for color via said band and near the base end of the cosmetic substance, all without closure-cap removal.

5. The improvement of claim 1, in which said container includes a cupped closure cap having removable friction fit over the projecting end of said sleeve, said sleeve and cap having coacting abutment formations to so limit the axial extent of said fit that in the fully applied position of said cap there remains a region of sleeve exposure between said cap and the nearby end of said outer tubular member.

6. The improvement of claim 5, in which said closure cap is opaque.

7. A cosmetic container comprising inner and outer relatively rotatable tubular members, a carrier cup within said members and having an open end for support of cosmetic or the like substance, propulsion cam formations in said members, radially outward cam-follower means on said carrier cup engaging said cam formations for axial propulsion of said carrier cup upon relative rotation of said members, means coating between said members to retain their axially overlapped relation, said cam formations and follower means including formations limiting axial propulsion between a retracted position and a forward position wherein cosmetic substance is projected beyond an axial end of said container, said inner tubular member including a transparent end formation extending axially beyond said outer tubular member at the end through which cosmetic substance is projectable, said open end of said carrier cup when in said retracted position being at substantially the axial location at which the transparent formation of said inner tubular member is exposed beyond said outer tubular member, and a cupped closure cap having removable closing fit to the axially extending end of said inner tubular member, said closure cap and said inner tubular member having coacting formations to limit closure cap placement to a point short of total axial overlap of said transparent end formation, whereby for a closed container and fully retracted carrier cup, cosmetic or the like substance carried by said cup will be externally viewable.

8. The container of claim 7, in which said outer tubular member is an elongate cup with an internally grooved cam formation.

9. The container of claim [5] *7*, in which the axially retaining means of said outer tubular member is a circumferentially continuous radially inwardly open groove in the inner wall thereof and near the open end of said inner tubular member.

10. The container of claim 9, in which the maximum radial extent of said axial-retaining groove exceeds the maximum radial dimension of the bottom of said grooved cam formation.

11. The container of claim 9, in which the open end of said outer tubular member has a counterbore, said axially retaining groove being in said counterbore, and the bottom of said grooved cam formation being of maximum radial dimension which is at least no greater than that of the ungrooved part of said counterbore, said grooved cam formation being axially open to said counterbore.

12. The container of claim 11, in which said axially retaining means of said inner tubular member comprises a circumferentially continuous radially outward bead having snap-fitted engagement with said circumferential groove.

13. The container of claim 12, in which said bead projects radially from an axially local radially outward band formation of said inner tubular member, said band formation being of sectional dimensions to be received with close clearance in said counterbore.

14. The container of claim 7, in which said inner tubular member is an elongate injection-molded sleeve of transparent plastic material with a slotted cam formation.

*15. In a container of the variety in which a carrier cup adapted to support cosmetic or the like substance at one end has cam-follower tracking engagement with axial propulsion cams of inner and outer rotatable tubular members, said tubular members each having an open end at the container end through which cup-supported cosmetic or the like substance is to be projectable, and the inner tubular member being a sleeve including a portion projecting beyond said open end of said outer member, the improvement in which said carrier cup is characterized by such an axial distance between the cam-follower location and said one end that in the retracted position of said carrier cup (a) said one end of said carrier cup is at substantially said open end of said outer member, and (b) the projecting portion of said sleeve is translucent and enshrouds substantially the entire usable length of cosmetic or the like substance carried by said carrier cup.*

*16. The improvement of claim 15, in which said sleeve is of transparent plastic material, whereby colored cosmetic or the like substance may be to an extent viewable via the projecting portion of said sleeve, for a retracted condition of said carrier cup.*

*17. A cosmetic container comprising inner and outer relatively rotatable tubular members, a carrier cup within said members and having an open end for support of cosmetic or the like substance, propulsion cam formations in said members, radially outward cam-follower means on said carrier cup engaging said cam formations for axial propulsion of said carrier cup upon relative rotation of said members, means coacting between said members to retain their axially overlapped relation, said cam formations and follower means including formations limiting axial propulsion between a retracted position and a forward position wherein cosmetic substance is projected beyond an axial end of said container, said inner tubular member including a transparent end formation extending axially beyond said outer tubular member at the end through which cosmetic substance is projectable, said open end of said carrier cup when in said retracted position being at substantially the axial location at which the transparent formation of said inner tubular member is exposed beyond said outer tubular member.*

*18. The container of claim 17, in which in said forward position said open end of said carrier cup is substantially at the open end of said inner tubular member.*

*19. In a container of the variety in which a carrier cup adapted to support cosmetic or the like substance at one end has cam-follower tracking engagement with axial propulsion cams of inner and outer rotatable tubular members, said tubular members each having an open end at the container end through which cup-supported cosmetic or the like substance is to be projectable, and the inner tubular member including a sleeve portion projecting beyond said open end of said outer member, the improvement in which said carrier cup is characterized by such an axial distance between the cam-follower location and said one end that (a) in the retracted position of said carrier cup said one end of said carrier cup is at substantially said open end of said outer member, and (b) the projecting portion of said sleeve is translucent and enshrouds substantially the entire usable length of cosmetic or the like substance carried by said carrier cup.*

* * * * *